United States Patent
Noguchi et al.

(10) Patent No.: US 9,953,604 B2
(45) Date of Patent: *Apr. 24, 2018

(54) DISPLAY DEVICE AND DRIVING METHOD PERFORMING DISPLAY SCAN OPERATION AND DETECTION SCAN OPERATION

(71) Applicant: Japan Display, Inc., Chita-gun (JP)

(72) Inventors: Kouji Noguchi, Kanagawa (JP); Takayuki Nakanishi, Aichi (JP); Koji Ishizaki, Aichi (JP); Yasuyuki Teranishi, Aichi (JP); Takeya Takeuchi, Aichi (JP)

(73) Assignee: Japan Display Inc., Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 14/543,202

(22) Filed: Nov. 17, 2014

(65) Prior Publication Data

US 2015/0070318 A1 Mar. 12, 2015

Related U.S. Application Data

(62) Division of application No. 12/793,036, filed on Jun. 3, 2010, now Pat. No. 8,947,371.

(30) Foreign Application Priority Data

Jun. 30, 2009 (JP) .................................. 2009-155194

(51) Int. Cl.
*G06F 3/041* (2006.01)
*G09G 3/36* (2006.01)
(Continued)

(52) U.S. Cl.
CPC ....... *G09G 3/3674* (2013.01); *G02F 1/13338* (2013.01); *G06F 3/044* (2013.01);
(Continued)

(58) Field of Classification Search
USPC ................................ 345/156, 173–178, 204
See application file for complete search history.

(56) References Cited

U.S. PATENT DOCUMENTS 6,636,194 B2   10/2003 Ishii
2004/0150629 A1   8/2004 Lee
(Continued)

FOREIGN PATENT DOCUMENTS

WO   WO 2007/146780   12/2007

*Primary Examiner* — Ram Mistry
(74) *Attorney, Agent, or Firm* — K&L Gates LLP

(57) ABSTRACT

Disclosed herein is a display device, including: a display surface; a display functional layer adapted to control the display of a screen viewed from outside the display surface; a drive control section operable to perform display scanning and driving adapted to scan and drive, in the one direction, the plurality of drive electrodes, and also operable to perform, a plurality of times and for M display screens, detection scanning and driving adapted to continuously scan and drive all or part of the plurality of drive electrodes within the period of time; and a plurality of sensor lines arranged in a direction other than the one direction to be separate from each other, which produce an electrical change if an object to be detected comes in contact with or proximity to the display surface while the drive control section performs the detection scanning and driving.

5 Claims, 15 Drawing Sheets

(51) Int. Cl.
  *G02F 1/1333* (2006.01)
  *G06F 3/044* (2006.01)
  *G09G 5/18* (2006.01)
  *G02F 1/1362* (2006.01)

(52) U.S. Cl.
  CPC ............ *G06F 3/0412* (2013.01); *G09G 5/18* (2013.01); *G02F 1/136286* (2013.01); *G09G 3/3648* (2013.01); *G09G 2310/02* (2013.01); *G09G 2320/0252* (2013.01); *G09G 2340/0435* (2013.01)

(56) References Cited

U.S. PATENT DOCUMENTS

| | | |
|---|---|---|
| 2006/0256093 A1 | 11/2006 | Furukawa et al. |
| 2008/0062139 A1 | 3/2008 | Hotelling et al. |
| 2008/0062140 A1 | 3/2008 | Hotelling et al. |
| 2008/0062147 A1* | 3/2008 | Hotelling ............ G02F 1/13338 345/174 |
| 2009/0115741 A1 | 5/2009 | Wang et al. |

* cited by examiner

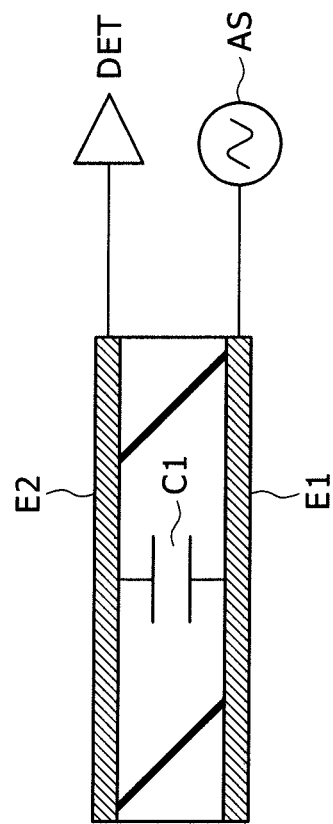
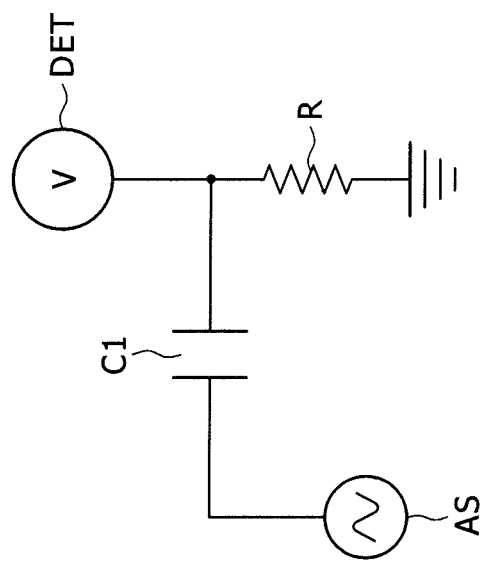
FIG.1B
FIG.1A

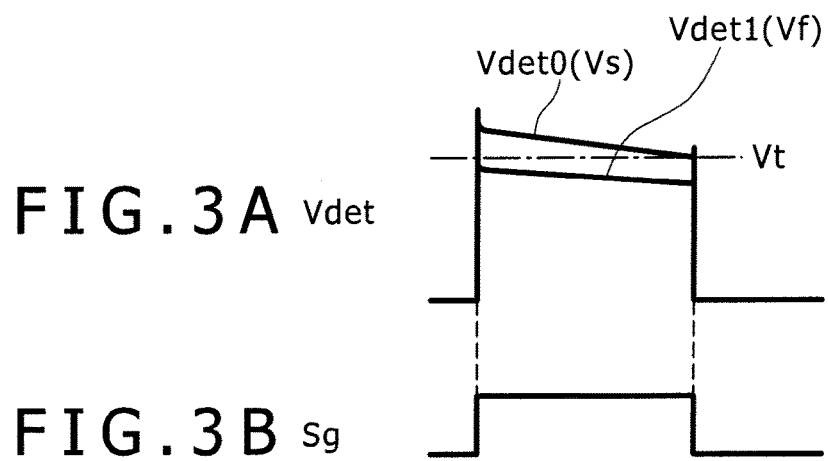
FIG.3A
FIG.3B
FIG.3C
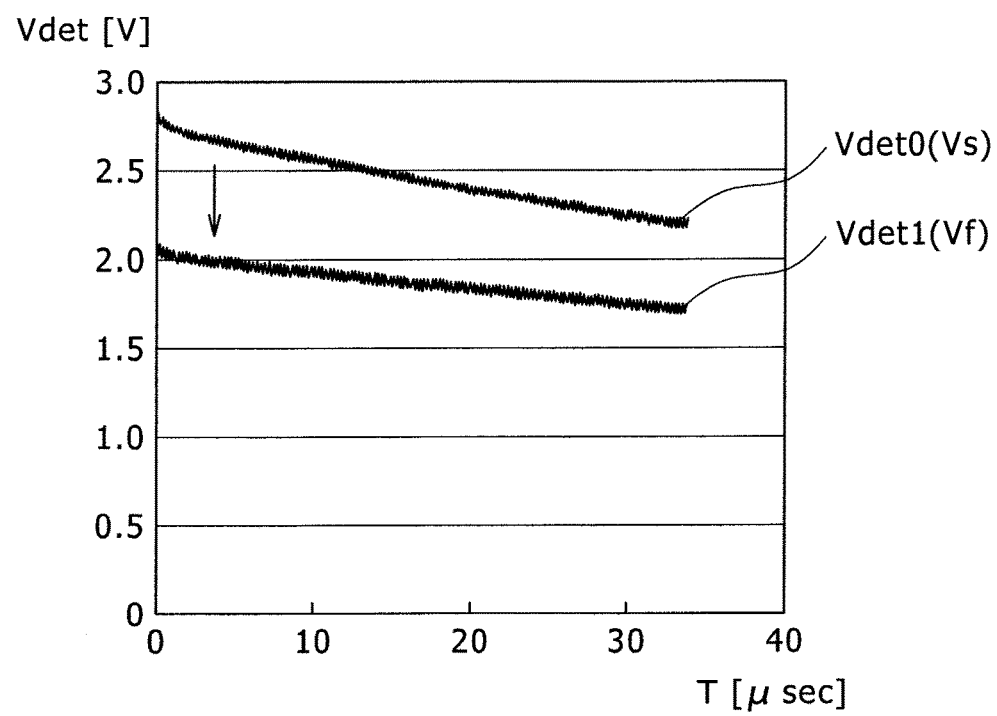

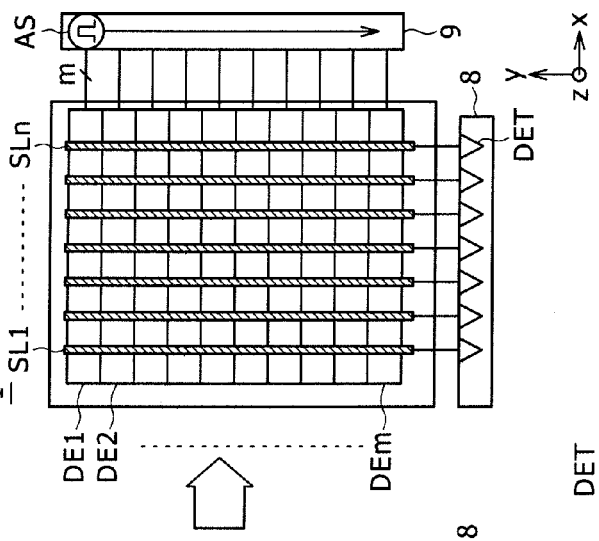

F I G . 5
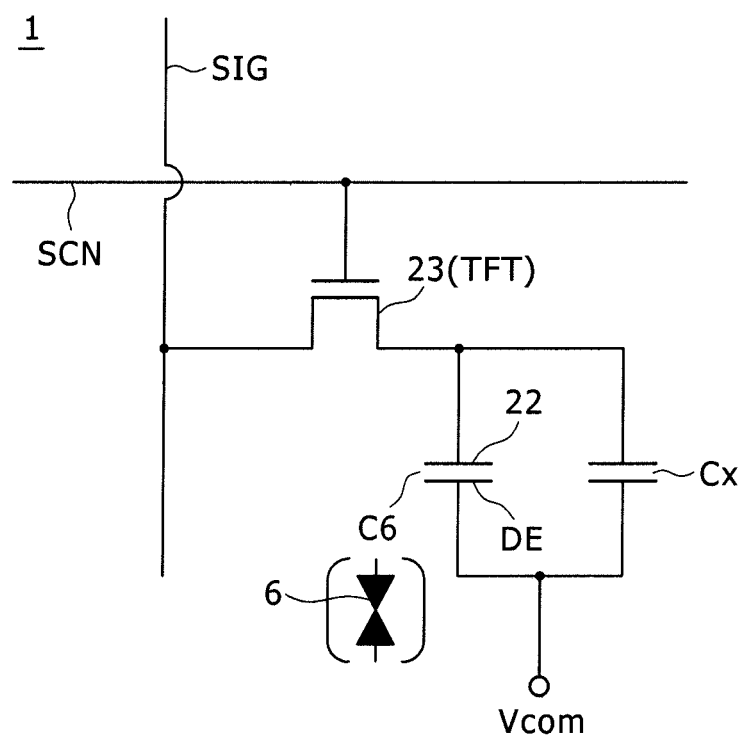

DISPLAY DEVICE AND DRIVING METHOD PERFORMING DISPLAY SCAN OPERATION AND DETECTION SCAN OPERATION

The subject matter of application Ser. No. 12/793,036, is incorporated herein by reference. The present application is a Divisional of U.S. Ser. No. 12/793,036, filed Jun. 3, 2010, which claims priority to Japanese Patent Application No. JP 2009-155194 filed with the Japanese Patent Office on Jun. 30, 2009, the entire content of which is hereby incorporated by reference.

BACKGROUND OF THE INVENTION

1. Field of the Invention

The present invention relates to a display device capable of detecting an object such as user's finger or pen coming in contact with or proximity to the display surface, and to a driving method of the same.

2. Description of the Related Art

Three methods, namely, optical method, resistance film method and electrostatic capacitance method, are known as the contact detection methods of a touch panel.

In order to associate the electrical change resulting from an object coming in contact or proximity with positional information, on the other hand, a number of wirings are required that are arranged in a matrix form and combined in such a manner as to allow identification of positions. An enormous number of wirings are necessary to provide improved detection resolution if position detection is conducted based on combinations of the wirings.

For this reason, one driving method is on its way to becoming mainstream in the above three detection methods. This driving method detects the contact or
proximity position while at the same time scanning, in one direction, the lines adapted to output the electrical change. This driving method is described in Hirotaka Hayashi etc. "Optical Sensor Embedded Input Display Usable under High-Ambient-Light Conditions," SID 07 DIGEST p 1105 (hereinafter referred to as Non-Patent Document 1) for the optical method, in Bong Hyun Youetc., "12.1-inch a-Si:H TFT LCD with Embedded Touch Screen Panel," SID 08 DIGEST p 830 (hereinafter referred to as Non-Patent Document 2) for the resistance film method, and in Joohyung Lee etc., "Hybrid Touch Screen Panel Integrated in TFT-LCD," SID 08 DIGEST p 834 (hereinafter referred to as Non-Patent Document 3) for the electrostatic capacitance method. Here, the term "lines" refers to rows or columns of extremely small sensor sections that are arranged two-dimensionally according to a predetermined rule for contact detection purposes.

Incidentally, overlaying a touch panel on a display panel leads to a thicker display module as a whole, resulting in increased area of the frame (portion around the effective detection surface) and increased cost.

Therefore, recent years have seen transitions in mainstream types of developed display modules from that having the touch panel overlaid on the display panel to that having the touch panel incorporated in the display panel (refer, for example, to the above Non-Patent Documents 1 to 3 and to Japanese Patent Laid-Open No. 2008-9750).

SUMMARY OF THE INVENTION

Users may perceive a delay from when they touch the detection surface to when the contact is detected. The longer the delay, the more degraded the operability. On the other hand, this delay must be reduced to an extremely small level depending on the application. The delay time from the issuance of an instruction to be executed to the completion of execution of the instruction is called a latency. The latency must be minimized to provide improved operability.

If both detection drive electrodes and display drive electrodes are used when a touch sensor function is incorporated in the display panel, it is necessary to synchronize the detection drive frequency with the display drive frequency. This makes it difficult to detect the contact faster than the speed specified for the display frequency. As a result, the latency remains to be reduced.

There is a need for the present invention to provide a display device having a contact detection function with high detection speed, for example, for minimal latency, and a driving method of the same.

A display device according to an embodiment of the present invention includes a detection surface, a display functional layer, a plurality of drive electrodes, a drive control section and a plurality of sensor lines.

The display functional layer controls the display of a screen viewed from outside the display surface.

The drive control section performs display scanning and driving adapted to scan and drive, in the one direction, the plurality of drive electrodes. The same section also performs, a plurality of times and for M display screens, detection scanning and driving adapted to continuously scan and drive all or part of the plurality of drive electrodes within the period of time in which N display screens are displayed by the display scanning and driving (where N and M are arbitrary natural numbers which satisfy the condition N<M).

The plurality of sensor lines are arranged in a direction other than the one direction to be separate from each other. The sensor lines produce an electrical change if an object to be detected comes in contact with or proximity to the display surface while the drive control section performs the detection scanning and driving.

This electrical change produced in the plurality of sensor lines is processed, for example, in the display device or externally thereto. The presence or absence of an object to be detected and the position thereof are detected by this process.

In such a configuration, although the drive control section controls both the display scanning and driving and detection scanning and driving, the detection scanning and driving is M/N-fold faster than the display scanning and driving (where N and M are arbitrary natural numbers which satisfy the condition N<M). This multiplication factor can be specified as desired, thus allowing for fast contact or proximity detection without being controlled by the display.

A driving method according to another embodiment of the present invention includes a step of driving adapted to perform detection scanning and driving with a same plurality of drive electrodes as for display scanning and driving. More specifically, this driving step performs display scanning and driving adapted to scan and drive, in one direction, a plurality of drive electrodes arranged in the one direction to be separate from each other on a surface opposed to a display surface whose screen is viewed externally. At the same time, this driving step performs detection scanning and driving of the same plurality of drive electrodes for sensor detection adapted to detect the change in capacitive coupling as a result of the approach of an object to be detected from a plurality of sensor lines that are capacitively coupled to the plurality of drive electrodes.

At this time, the driving step performs, a plurality of times and for M display screens, detection scanning and driving adapted to continuously scan and drive all or part of the plurality of drive electrodes within the period of time in which N display screens are displayed by the display scanning and driving (where N and M are arbitrary natural numbers which satisfy the condition N<M).

The present invention provides a display device having a contact detection function with high detection speed, for example, for minimal latency, and a driving method of the same.

BRIEF DESCRIPTION OF THE DRAWINGS

FIGS. 1A and 1B are an equivalent circuit diagram and schematic cross-sectional view for describing a touch sensor section according to first and second embodiments;

FIGS. 3A to 3C are diagrams illustrating input and output waveforms of the touch sensor section according to the first and second embodiments;

FIGS. 4A to 4D are plan views and a schematic cross-sectional view illustrating the configuration of a display device according to the first embodiment;

FIG. 5 is an equivalent circuit diagram of a pixel;

FIGS. 6A1 to 6B3 are diagrammatic plan views during double speed scan in the first embodiment;

FIGS. 7A1 to 7C2 are diagrammatic plan views during triple speed scan in the first embodiment;

DETAILED DESCRIPTION OF THE PREFERRED EMBODIMENTS

Figure 2B:
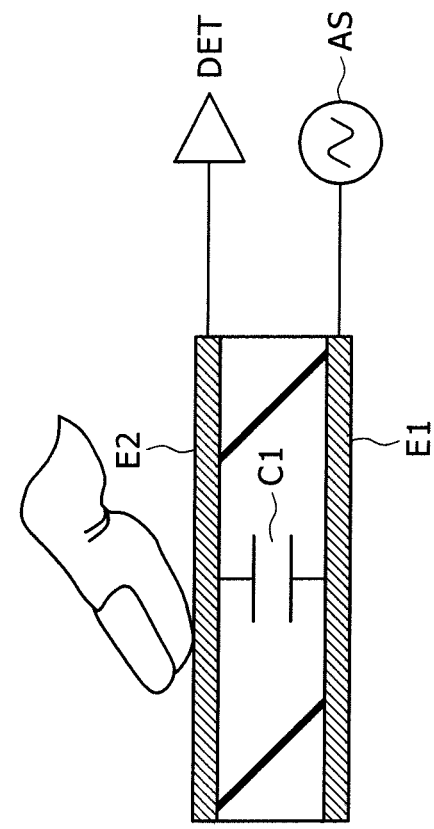
FIGS. 2A and 2B are an equivalent circuit diagram and schematic cross-sectional view when a finger comes in contact or approaches the touch sensor section shown in FIGS. 1A and 1B.

A description will be given below of embodiments of the present invention with reference to the accompanying drawings by taking, as a primary example, an FFS mode liquid crystal display device incorporating a touch sensor function based on electrostatic capacitance. It should be noted that the present invention is applicable to other types of liquid crystal display devices such as vertical electric field mode liquid crystal display device, in addition to FFS mode liquid crystal display devices. On the other hand, the present invention is applicable not only to contact detection based on the electrostatic capacitance method but also to contact detection based on the resistance film and optical methods.

It should be noted that the description will be given in the following order:

1. First embodiment: Liquid crystal display device adapted to perform detection driving at double speed or more
2. Second embodiment: Liquid crystal display device adapted to perform detection driving in such a manner as not to affect the display when the detection driving at triple speed or more passes the display driving
3. Third embodiment: Liquid crystal display device adapted to discretely reduce the number of drive electrodes subjected to detection scanning and driving
4. Modification example 1: Liquid crystal drive in transverse electric field mode
5. Modification example 2: So-called border scanning system adapted to simultaneously perform detection scan of a plurality of drive electrodes associated with a pixel pitch
6. Examples of application to electronic equipment 1. First Embodiment

[Basic Configuration for Contact Detection and Operation]

A description will be given first of the basics of electrostatic capacitance-based contact detection with reference to FIGS. 1A to 3C as a precondition in the first embodiment (condition common to this and other embodiments).

Figure 2A:
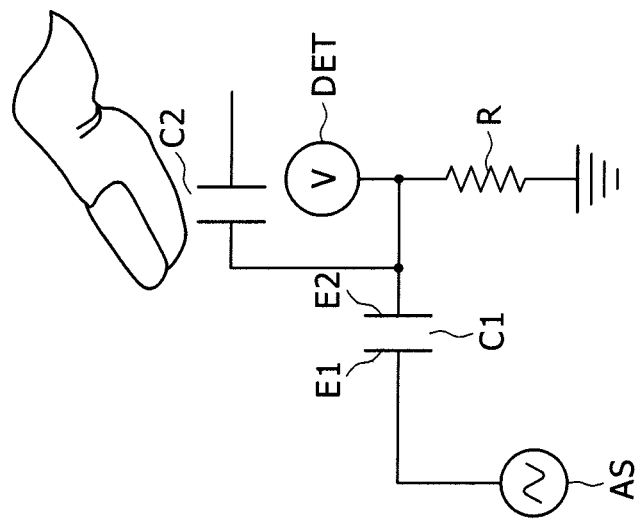
Figure 6:
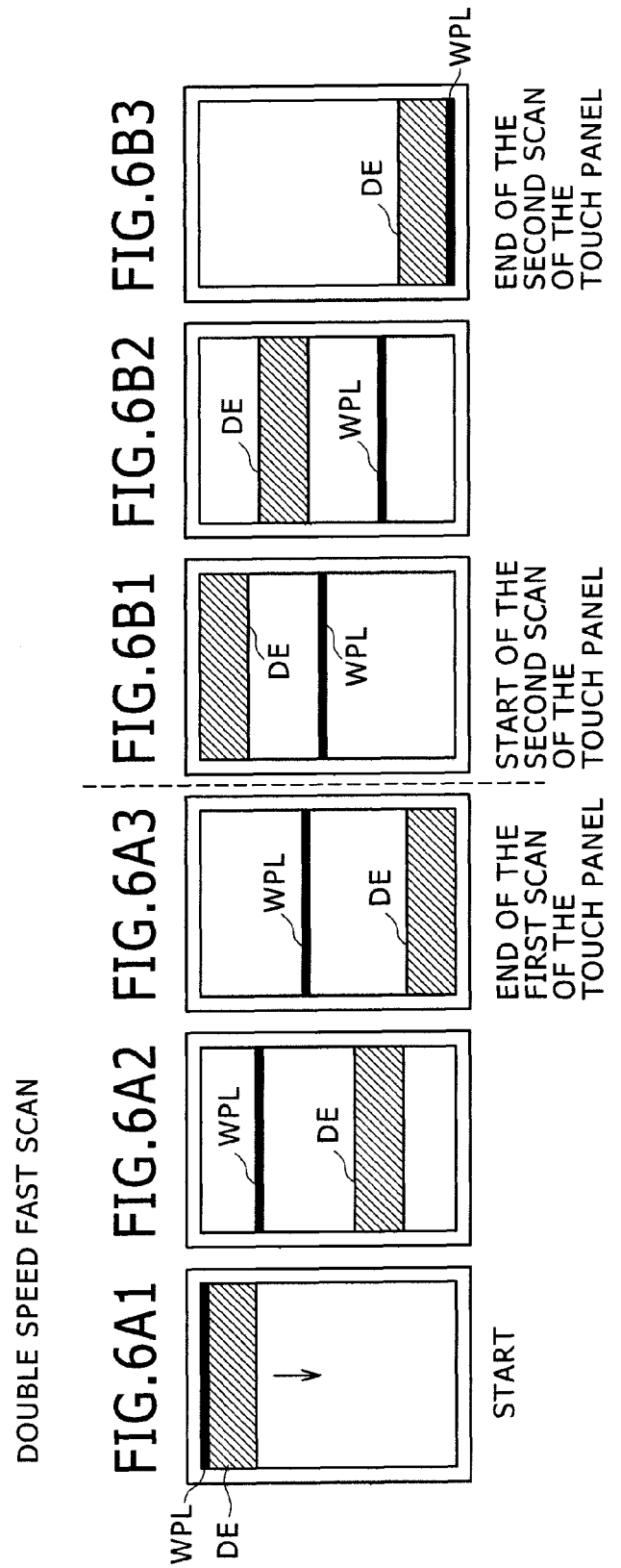
Figure 7:
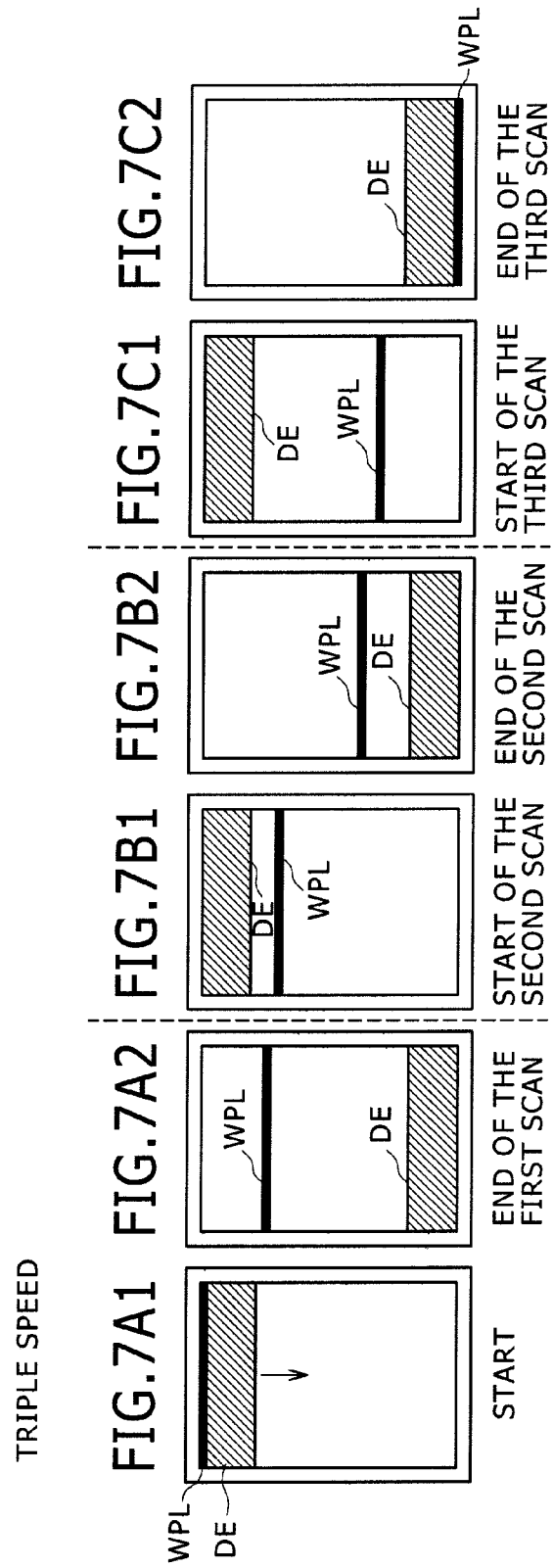

FIGS. 1A and 2A are equivalent circuit diagrams of a touch sensor section, and FIGS. 1B and 2B structural diagrams (schematic cross-sectional views) of the touch sensor section. Here, FIGS. 1A and 1B illustrate a case in which an object to be detected or a finger is not in proximity to the sensor, and FIGS. 2A and 2B a case in which a finger is in proximity to or contact with the sensor.

The touch sensor section illustrated in the figures is an electrostatic capacitance touch sensor that includes a capacitive element as illustrated in FIGS. 1B and 2B. More specifically, a capacitive element (electrostatic capacitance) $C1$ is formed with a dielectric D and a pair of electrodes, i.e., a drive electrode $E1$ and detection electrode $E2$, opposed to each other with the dielectric D provided therebetween.

As illustrated in FIGS. 1A and 2A, the drive electrode $E1$ of the capacitive element $C1$ is connected to an alternate current (AC) signal source AS adapted to generate an AC pulse signal Sg. The detection electrode $E2$ thereof is connected to a detection circuit DET. At this time, the detection electrode $E2$ is grounded via a resistor R. As a result, the direct current (DC) level of the same electrode $E2$ is electrically fixed. It should be noted that grounding via a resistor is not absolutely necessary. The detection electrode $E2$ may be, for example, fixed to the GND or other potential for a given period of time via a logic circuit and be allowed to float for other given period of time.

The AC pulse signal Sg at a predetermined frequency such as several to several tens of kHz is applied to the drive electrode $E1$ from the AC signal source AS.

An example of a waveform of the AC pulse signal Sg is shown in FIG. 3B. A signal with an output waveform shown in FIG. 3A (detection signal Vdet) appears at the detection electrode E2 in response to the application of the AC pulse signal Sg.

It should be noted that although a detailed description will be given later in relation to other embodiments, the drive electrode E1 corresponds to an opposed electrode adapted to drive liquid crystal (electrode opposed to a pixel electrode and shared by a plurality of pixels). Here, the opposed electrode is driven by an AC voltage to drive the liquid crystal. This driving is referred to as Vcom driving. In other embodiments, therefore, a common drive signal for Vcom driving can also be used as the AC pulse signal Sg adapted to drive the drive electrode E1 for the touch sensor.

When a finger is not in contact with the sensor as illustrated in FIG. 1B, the drive electrode E1 of the capacitive element C1 is driven by AC voltage. As the capacitive element C1 is charged and discharged, the AC detection signal Vdet appears at the detection electrode E2. The detection signal at this time will be hereinafter written as an "initial detection signal Vdet0." Although DC-grounded, the detection electrode E2 is not grounded in terms of high frequency. Therefore, there is no AC discharge path. As a result, the pulse peak level of the initial detection signal Vdet0 is relatively high. It should be noted, however, that the pulse peak level of the initial detection signal Vdet0 gradually drops due to loss in a period of time after the leading edge of the AC pulse signal Sg.

FIG. 3C illustrates an enlarged waveform at an enlarged scale. The pulse peak level of the initial detection signal Vdet0 drops by about 0.5 V from the initial level of 2.8 V in a short period of time.

When a finger comes in contact with or approaches the detection electrode E2 to a distance close enough to affect the same electrode E2 in this initial condition, the circuit changes to a condition equivalent to that in which the detection electrode E2 is connected to a capacitive element C2. The reason for this is that the human body becomes equivalent, in terms of high frequency, to a capacitance one of whose sides is grounded.

In this contact condition, an AC signal discharge path via the capacitive elements C1 and C2 is formed. Therefore, as the capacitive elements C1 and C2 are charged and discharged, AC currents I1 and I2 flow respectively through the same elements C1 and C2. As a result, the voltage level of the initial detection signal Vdet0 is divided, for example, according to the capacitance ratio between the capacitive elements C1 and C2, thus resulting in lower pulse peak level.

A detection signal Vdet1 shown in FIGS. 3A and 3C appears when the finger comes in contact with the detection electrode E2. It is clear from FIG. 3C that the pulse peak level of the detection signal drops by about 0.5 V to 0.8 V. The detection circuit DET shown in FIGS. 1A to 2B detects the contact of a finger by detecting the drop of the detection signal using, for example, a threshold Vt.

[Rough Configuration of Display Device]

FIGS. 4A to 4C illustrate plan views of the display device according to the present embodiment with primary emphasis on the electrodes thereof and the arrangement of the circuits adapted to drive and scan the electrodes. FIG. 4D illustrates a schematic cross-sectional structure of the display device according to the present embodiment. FIG. 4D illustrates, for example, a cross section of six pixels in the row direction (direction along the pixel display lines). FIG. 5 is an equivalent circuit diagram of a pixel.

The display device illustrated in FIGS. 4A to 4D is a liquid crystal display device having a liquid crystal layer serving as a "display functional layer."

The liquid crystal display device has electrodes (drive electrodes) on one of two substrates that are opposed to each other with a liquid crystal layer provided therebetween. Each of these electrodes is shared by a plurality of pixels. A common drive signal Vcom is applied to these electrodes so as to supply a reference voltage relative to a signal voltage for gray level display to each of the pixels.

In FIG. 4D, the drive, pixel and detection electrodes, i.e., primary components of the present invention, are hatched, but other portions (e.g., substrates, insulating film and functional film) are not, to make the cross-sectional structure easier to see. The same is true for other cross-sectional structural diagrams which will be shown later.

A liquid crystal display device 1 includes pixels PIX, shown in FIG. 5, arranged in a matrix form. Each of the pixels PIX includes a thin film transistor (TFT; hereinafter referred to as a TFT 23), equivalent capacitor C6 of a liquid crystal layer 6 and holding capacitor (additional capacitor) Cx. One of the electrodes of the equivalent capacitor C6 representing the liquid crystal layer 6 is a pixel electrode 22 that is provided one for each pixel. The same electrodes 22 are arranged in a matrix form. The other electrode of the equivalent capacitor C6 is a drive electrode DE that is shared by a plurality of pixels.

The pixel electrode 22 is connected to one of the source and drain of the TFT 23. A video signal line SIG is connected to the other of the source and drain of the TFT 23. The video signal line SIG is connected to an unshown vertical drive circuit. A video signal having a signal voltage is supplied to the video signal line SIG from the vertical drive circuit.

The drive electrode DE is supplied with the common drive signal Vcom. The same signal Vcom alternates between positive and negative potentials relative to the center potential every horizontal period (1H).

The gate of the TFT 23 is electrically shared by all the pixels PIX arranged in the row direction, i.e., horizontally on the display screen, thus forming a scan line SCN. The same line SCN is supplied with a gate pulse to open or close the gate of the TFT 23. The gate pulse is output from the unshown vertical drive circuit. Therefore, the scan line SCN is also referred to as a gate line.

As illustrated in FIG. 5, the holding capacitor Cx and equivalent capacitor C6 are connected in parallel. The holding capacitor Cx is provided to prevent the write potential from dropping due, for example, to a leak current of the TFT 23 as a result of insufficient storage capacitance of the equivalent capacitor C6. Further, the addition of the holding capacitor Cx also prevents flicker and contributes to improved uniformity of screen luminance.

The cross-sectional structure (FIG. 4D) of the liquid crystal display device 1 reveals that the same device 1 includes a substrate (hereinafter referred to as a drive substrate 2) on which the TFTs 23 illustrated in FIG. 5 are formed in the area not shown in the cross-section and to which a pixel drive signal (signal voltage) is supplied. The same device 1 also includes an opposed substrate 4 provided to be opposed to the drive substrate 2 and the liquid crystal layer 6 provided between the drive and opposed substrates 2 and 4.

The drive substrate 2 includes a TFT substrate (substrate body section made, for example, of glass) 21, the drive electrode DE and plurality of pixel electrodes 22. The TFT substrate 21 serves as a circuit substrate on which the TFTs 23 shown in FIG. 5 are formed. The drive electrode DE and pixel electrodes 22 are formed on the TFT substrate 21.

Here, the drive electrode DE is formed on the TFT substrate 21 as an example to show the cross-sectional structure of a liquid crystal display device in transverse electric field mode. The common drive signal Vcom having an AC pulse waveform is applied to the drive electrode DE. The same signal Vcom corresponds to the AC pulse signal Sg supplied from the AC signal source AS shown in FIGS. 1A to 2B.

The drive electrode DE serves both as an AC drive electrode for display purposes and as a drive electrode of a contact detection sensor that forms part of the contact sensor adapted to detect contact. The drive electrode DE corresponds to the drive electrode E1 in FIGS. 1B to 2B. It should be noted that the drive electrode serves both as a display drive electrode and sensor detection drive electrode. However, the Vcom drive signal for display driving may be used as a sensor detection drive signal. Alternatively, other AC drive signal may be used as a sensor detection drive signal.

An insulating layer is formed on the drive electrode DE. The plurality of pixel electrodes 22 are arranged in a matrix form on the TFT substrate 21 so as to be opposed to the drive electrode DE via the insulating layer.

A display driver (e.g., vertical and horizontal drive circuits) is formed on the TFT substrate 21 to drive the pixel electrodes 22. On the other hand, although not shown in FIG. 4D, the TFTs 23, video signal lines SIG, scan lines SCN shown in FIG. 5 and other wirings are formed on the TFT substrate 21.

The opposed substrate 4 includes a glass substrate 41 and color filter 42. The color filter 42 is formed on one side of the glass substrate 41 and includes, for example, red (R), green (G) and blue (B) color filter layers that are arranged periodically. One of the R, G and B is assigned to each of the pixels PIX (pixel electrodes 22). It should be noted that a pixel to which a single color is assigned is called a subpixel, and three subpixels of R, G and B are called a pixel in some cases. Here, however, even subpixels are written as the pixels PIX.

Sensor lines SL are formed on the other side (display surface side) of the glass substrate 41. Further, a protective layer 45 is formed on the sensor lines SL. The sensor lines SL form part of the touch sensor and corresponds to the detection electrode E2 in FIGS. 1B to 2B.

The liquid crystal layer 6 serves as a display functional layer and modulates the light transmitting through the same layer 6 in the direction of the width (in the direction in which the electrodes are opposed to each other) according to the condition of the electric field applied. Liquid crystal materials in different modes such as TN (twisted nematic), VA (vertically aligned) and ECB (electrically controlled birefringence) liquid crystal materials are used as the liquid crystal layer 6.

It should be noted that although not shown in FIG. 4D, orientation films are disposed one between the liquid crystal layer 6 and pixel electrodes 22, and another between the liquid crystal layer 6 and color filter 42. Further, polarizers are disposed, one on the non-display surface side (i.e., rear side) of the drive substrate 2, and another on the display surface side of the opposed substrate 4.

n sensor lines SL1 to SLn are made up of a plurality of thin long wirings extending in the Y direction as illustrated in FIG. 4B. An arbitrary one of the sensor lines SL1 to SLn will be hereinafter written as a sensor line SL.

The direction in which the drive electrode DE is disposed is determined in such a manner that its longitudinal direction is different from the direction in which the sensor lines SL1 to SLn are disposed (longitudinal direction). Here, the drive electrodes DE are formed in the shape of long strips in the X direction, and the m drive electrodes DE are arranged at the same pitch in the Y direction, as illustrated in FIGS. 4A and 4C.

The pitch at which drive electrodes DE1 to DEm, into which the drive electrode DE is divided, are arranged is set to be a natural number multiple of the pitch at which the pixel electrodes are disposed. The minimum pitch at which the divided drive electrodes DE are arranged is equal to the pitch at which the electrode pixels are arranged (pixel pitch). However, this pitch should preferably correspond to a pitch of several to several tens of pixels. The major reason for this is to provide improved sensor sensitivity. A detailed description thereof will be given later in modification examples adapted to achieve compatibility between providing improved sensor sensitivity and making the pixel electrodes invisible.

As illustrated in FIG. 4C, a drive control section 9 is disposed to be connected to one ends of the m drive electrodes DE1 to DEm. Further, a contact detection section 8 is disposed to be connected to one ends of the n sensor lines SL1 to SLn.

The drive control section 9 has the AC signal source AS (refer to FIGS. 1A to 2B) for each drive electrode. The same section 9 is designed to switch the AC signal source AS to be activated in the direction shown by the arrow (scan direction) in its block shown in FIG. 4A. Alternatively, the same section 9 has the single AC signal source AS and is designed to switch the connection between the same source AS and one of the m drive electrodes DE in the above scan direction.

FIGS. 4A to 4D illustrate a case in which the common drive signal Vcom, a drive signal for the display scanning and driving, is used as a drive signal for the detection scanning and driving. Therefore, the drive control section 9 handles the detection scanning and driving and display scanning and driving.

Here, the term "display scanning and driving" in the embodiment of the present invention refers, for example, to an operation adapted to accomplish screen display by repeating two operations, one in which the common drive signal Vcom is applied, and another in which the target to which the signal is applied is shifted in one direction. On the other hand, the term "detection scanning and driving" refers to an operation adapted to perform, a plurality of times and for M display screens, two operations, one in which a detection drive voltage (e.g., AC voltage) is applied, and another in which the target to which the voltage is applied is shifted in one direction (where N and M are arbitrary natural numbers which satisfy the condition N<M).

Further, the term "scanning" refers to an operation adapted to switch between the drive electrodes, to which to supply a drive voltage (not necessarily AC or DC), from the first one of the m drive electrodes on one side to the last one on the other side.

In the Vcom driving performed for each of the drive electrodes DE as described above, on the other hand, the shifting is accomplished by the drive control section 9 serving as a "detection scan and drive control section" that is provided in the unshown vertical drive circuit (write drive and scan section).

This configuration allows for the contact detection section 8 to detect the position along the row of the detection circuit DET that has developed a voltage change. The detection timing provides positional information along the column. That is, we assume that the Vcom driving of the drive control section 9 and the operation of the contact detection section 8 are in synchronism by means of a clock signal of a given period. Then, because the two operations are in synchronism, it is possible to learn which drive electrode is driven by the drive control section 9 when the contact detection section 8 detects a voltage change, thus allowing for detection of the center of the position touched by the finger. Such a detection operation is controlled by an unshown computer-based centralized control circuit adapted to control the liquid crystal display device 1 as a whole in a centralized manner such as a CPU, microcomputer or a contact detection control circuit.

The drive control section 9 is formed on the drive substrate 2 shown in FIG. 4D. However, the contact detection section 8 may be provided on the drive substrate 2 or opposed substrate 4. Alternatively, the same section 8 may be provided externally to the liquid crystal display device 1.

Because a large number of TFTs are integrated, the contact detection section 8 should preferably be formed on the drive substrate 2 together with the drive control section 9 to reduce the number of manufacturing steps. This, however, may lead to a higher wiring resistance because the sensor lines SL, provided on the opposed substrate 4, are made of a transparent electrode material. In such a case, the contact detection section 8 should preferably be formed on the opposed substrate 4 to avoid malfunctions resulting from a high wiring resistance. It should be noted, however, that using the TFT forming process merely for the contact detection section 8 leads to higher cost. Therefore, where to form the contact detection section 8 is should be determined in comprehensive consideration of the above advantage and disadvantage.

A description will be given below of the scanning and driving method for display and detection which is the characteristic of the present embodiment based on the above configuration as a precondition.

In a word, this scanning and driving method performs the detection driving M/N-fold faster than the display driving (where N<M).

More specifically, although scan at an integer multiple speed such as double or triple speed scan is preferred, the scan speed is not limited to an integer multiple speed and may be 1.5-time speed.

A detailed description will be given below of the driving method by taking, as an example, double to quad speed scan.

[Double Speed Scan]

FIGS. 6A1 to 6B3 illustrate diagrammatic plan views during double speed scan.

In FIGS. 6A1 to 6B3, the pixel line subjected to the display scanning and driving as a result of the vertical drive circuit turning on the access transistor AT shown in FIG. 5 is written as a "write pixel line WPL." It should be noted that the common drive signal Vcom is supplied to the drive electrode DE associated with the write pixel line WPL. However, the drive electrode DE that is Vcom-driven to display the write pixel line WPL is not shown in FIGS. 6A1 to 6B3. The drive electrode dE shown in FIGS. 6A1 to 6B3 is that subjected to the sensor detection driving.

The first scan starts in FIG. 6A1. At this time, the scan starts from the first write pixel line WPL for the display scanning and driving in the first example. The scan ends in the last figure (FIG. 6B3) when the display of a screen is completed.

In contrast, the panel is scanned twice within one screen display period for the detection scanning and driving. The first scan starts in FIG. 6A1 and ends in FIG. 6A3. The second scan starts in FIG. 6B1 and ends in FIG. 6B3.

More specifically, the contact detection scan is performed two times faster than the progressive display scan. When the two scans begin at the same time, the first detection scan over the entire surface ends when half of the display scan is completed. The contact detection scan returns to the initial position and restarts. The second contact detection scan catches up with the display scan at the last line.

Assuming that a screen (frame) is displayed for a period of 16.7 ms (60 Hz), that is, writing of a frame is conducted over this period of time, the contact detection scan is completed in a period of 8 ms or so, which is approximately half the display period.

FIGS. 7A1 to 7C2 show similar explanatory diagrams during triple speed scan.

Figure 8:
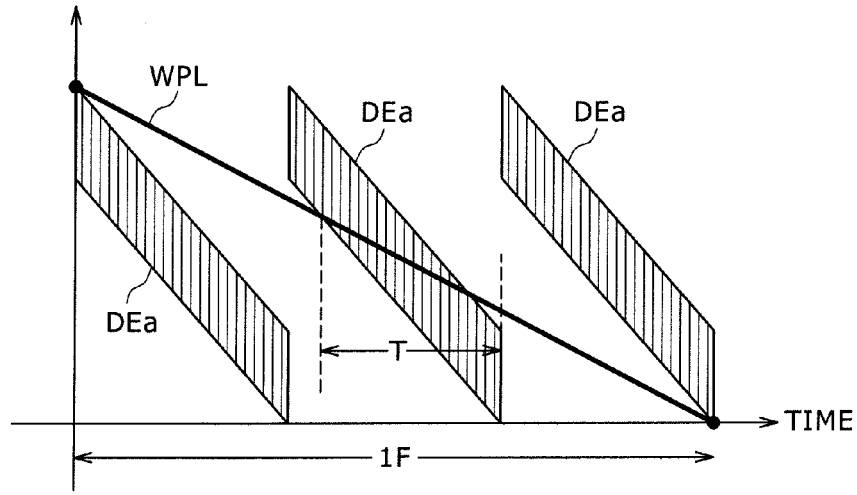
FIG. 8 is another diagram illustrating double speed scan.

The triple speed scan shown in FIGS. 7A1 to 7C2 can be illustrated in a different manner as shown in FIG. 8. The horizontal axis in this illustration shows the elapsed time, and the vertical axis the vertical position of the screen. The maximum elapsed time is one frame (1F).

Assuming the display scan of the write pixel line WPL begins from the drive electrode on one end of the screen, the drive electrode DE1 on one side is driven. The detection driving scan continues until the last drive electrode Dem is reached. The group of drive electrodes subjected to this series of detection scans are denoted by reference symbol "DEa (=DE1 to Dem)" in FIG. 8. The drive electrode DEa is scanned three times each time the screenful of write pixel lines WPL are scanned.

Figure 9:
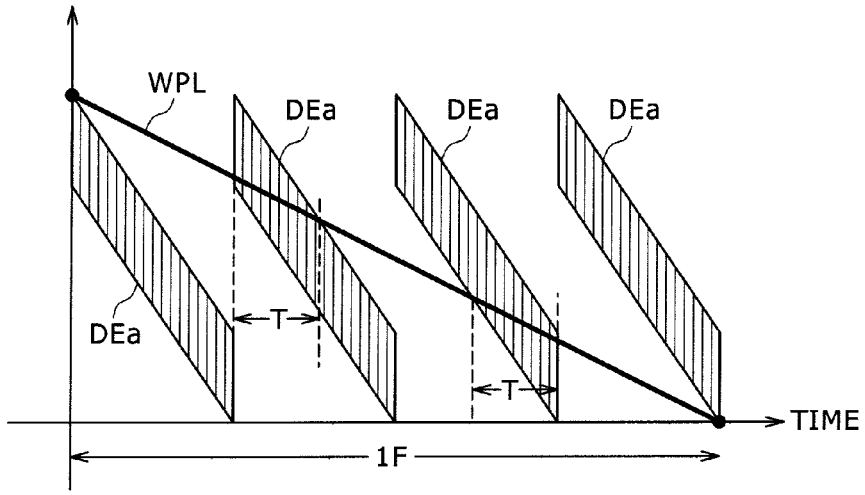
FIG. 9 is still another diagram illustrating triple speed scan.

FIG. 9 shows the quad speed scan for the same display method as shown in FIG. 8.

As is clear from the display method shown in FIGS. 8 and 9, the drive electrode DE subjected to the detection scan passes the write pixel line WPL subjected to the display scan (N−2) times in fast scan performed at N-time speed equal to or higher than triple speed.

It should be noted that, in FIGS. 6A1 to 9, the drive electrode DE may be adjacent to the write pixel line WPL from where the first scan begins so that no passing takes place at an early stage. That is, the detection scan may begin from the drive electrode DE2. It should be noted, however, that the present invention is not limited thereto, and the detection scan may begin from the desired drive electrode DE. Alternatively, the write pixel line WPL and drive electrode DE may be spaced by one or more drive electrodes DE.

2. Second Embodiment

As described above, in the case of the contact detection scan performed at triple speed or more, the contact detection scan passes the display scan at some points. When the write pixel line WPL being displayed is driven by the contact detection scan (detection scanning and driving) at the same time, problems such as noise in the video signal may occur due to the contact detection drive signal. In this case, dim stripes may be constantly observed at locations associated with the points where the passing takes place, thus resulting in degradation of the display quality.

The present embodiment proposes two approaches to prevent this degradation of the display quality.

The first approach is to skip at least one drive electrode DE (or more) at points where the drive electrode DE subjected to the detection scan passes that subjected to the display scan or before and after these points. This approach is a so-called discretely reducing method adapted to discretely reduce the number of drive electrodes subjected to the contact detection scans.

The second approach is to perform the contact detection scans on separate occasions so that no passing takes place.

With this approach, the detection scan progressively scans some of the m drive electrodes DE on each occasion.

[First Approach]

Although not particularly illustrated, the write pixel line WPL has precedence during a time period T in which the detection scan and display scan overlap each other. During the time period T, the drive electrode DE overlapping the write pixel line WPL is not used. More preferably, the drive electrode DE subjected to the contact detection should be always separated from the write pixel line WPL by at least one drive electrode DE before and after the scan during the time period T.

This control is performed by the scan drive section 9 shown, for example, in FIGS. 4A to 4D in response to the control performed by the CPU.

[Second Approach]

Figure 10:
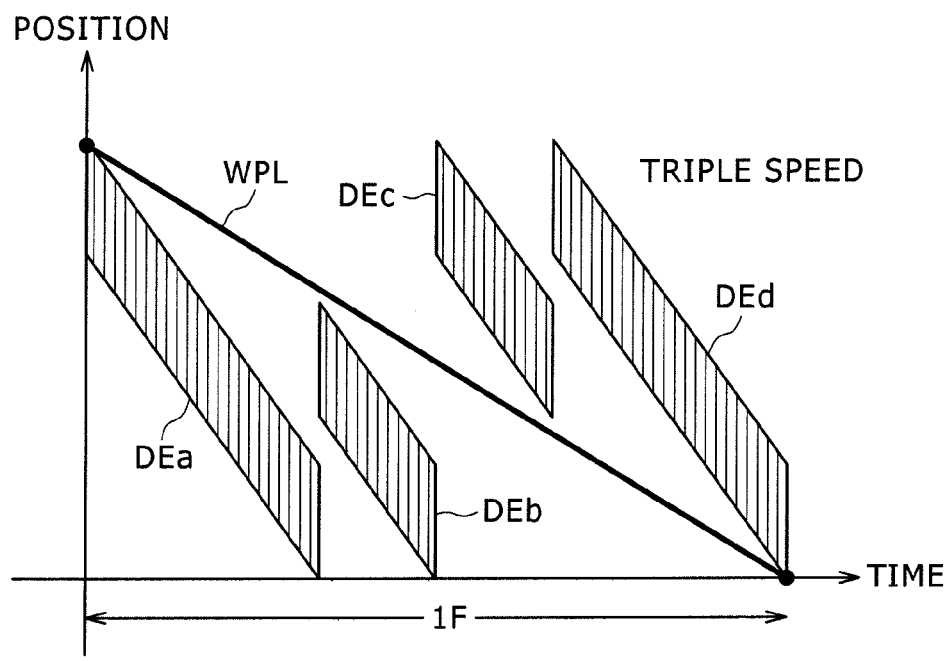
FIG. 10 is a diagram illustrating triple speed scan to show a technique according to the second embodiment.
Figure 11:
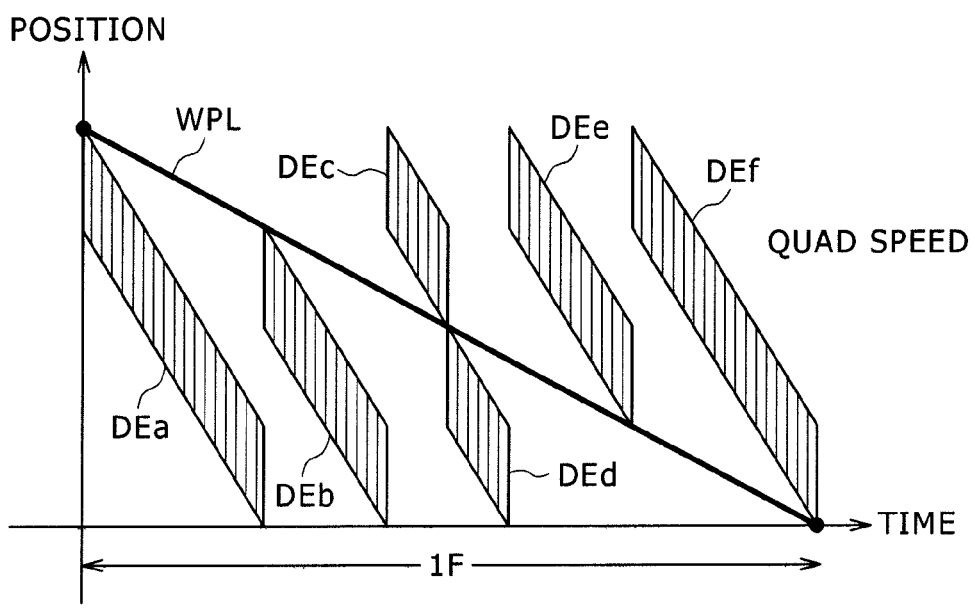
FIG. 11 is a diagram illustrating quad speed scan to show the technique according to the second embodiment.

FIGS. 10 and 11 illustrate, respectively, the triple and quad speed scans to which the second approach is applied.

In FIG. 10, the drive electrodes DEa and DEd are subjected to a full detection scan on one occasion. In contrast, drive electrodes DEb and DEc are subjected to a partial detection scan on two separate occasions. The drive electrodes are scanned in order starting from DEa to DEb to DEc to DEd.

Similarly in FIG. 11, the drive electrodes DEa and DEf are subjected to a full detection scan on one occasion. In contrast, the drive electrodes DEb to DEe are subjected to a partial detection scan on separate occasions. The number of the drive electrodes DEb and DEc added together is more or less equivalent to the number of drive electrodes for a complete scan. The drive electrodes are scanned in order starting from DEa to DEb to DEc to DEd to DEe to DEf.

With these two approaches, the drive electrodes DE subjected to the detection scan never pass the write pixel line WPL, thus preventing degradation of the display quality.

It is to be noted, like the first approach, the write pixel line WPL can be separated from the drive electrodes DE subjected to the detection scan by at least one drive electrode DE, not a target to be scanned.

3. Third Embodiment

Figure 12:
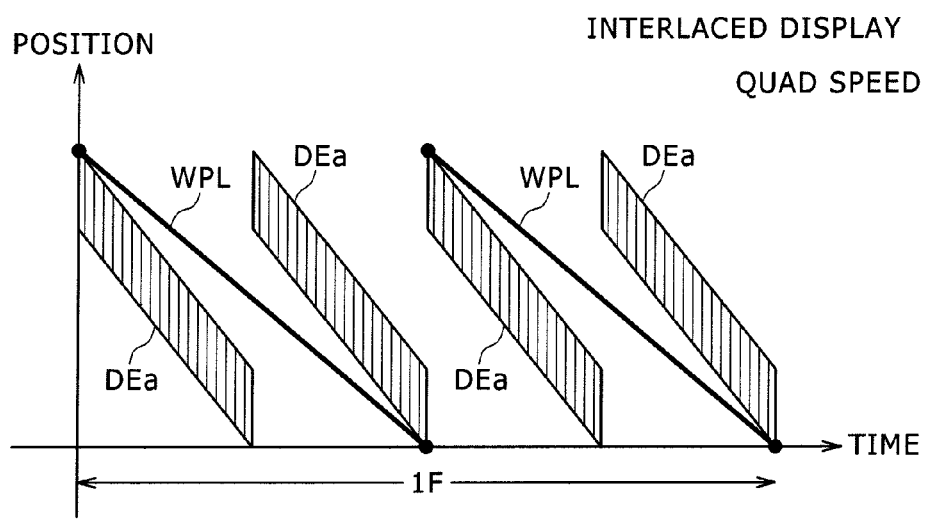
FIG. 12 is a diagram illustrating a technique according to a third embodiment.

FIG. 12 is a diagram illustrating a driving method according to a third embodiment.

This driving method performs the detection scan nearly two times faster than the display scan. Here, if border scanning is performed with the arrangement pitch of the drive electrodes DE in the Y direction being k-fold the pixel pitch in the Y direction, the larger the drive electrode pitch is than the pixel pitch, the farther apart the double speed of the display scan is from the detection scan speed. It should be noted, however, that the value k is significantly smaller than the vertical pixel count. As a result, the difference in speed is small. Therefore, the display scan and detection scan can be performed almost at the same frequency. This is advantageous in that the configuration of the scan drive section 9 or clock generating circuit can be simplified. It should be noted, however, that interlaced scan must be used for the display scan.

It can be said that the driving shown in FIG. 12 is designed to discretely reduce the number of detection scans by performing one detection scan with a discretely reduced number of drive electrodes scanned for every two display scans.

It should be noted that one detection scan with a discretely reduced number of drive electrodes scanned may be performed for every three display scans.

In addition to providing a simpler circuit, the driving method according to the third embodiment is also advantageous in the following respects.

That is, the drive frequency of the contact detection scan can be increased greater than that of the display scan. However, this leads to a significant change in voltage applied to the drive electrodes DE during display write, thus adversely affecting the signal line potential via the capacitive coupling. As a result, this scheme is not preferred.

Every several lines rather than scanning every line may be scanned for contact detection with the display and detection scans set to the same frequency, thus minimizing possible adverse impact.

A description will be given next of the common effect of the first to third embodiments described above.

The liquid crystal display device configured as described above includes the drive electrode DE for liquid crystal display that is cut into lines, performing two types of scanning and driving, one adapted to drive the liquid crystal and another adapted to detect the contact. In this case, the detection scanning and driving is in synchronism with the image write, and the scan frequency is normally 60 Hz (the scan time for a single scan is 16.7 ms). If the screen is touched immediately after the scan, the detection takes place in 33.4 ms (16.7 ms×2). This is followed by the processing by the CPU and other circuitry, as a result of which the contact with the screen is recognized. Based on the recognition of the contact with the screen, some kind of response occurs including the change in image or activation of a given switch depending on the specification of the predetermined application program.

Incidentally, it is commonly said that software processing following the contact requires 50 to 100 ms. As a result, it takes about 100 ms before the response is transmitted to the user. The user feels stressed because he or she perceives the response as extremely slow.

Because the display and contact detection are in synchronism, a possible solution would be to increase the write frequency to remedy the above problem.

However, increasing the write frequency leads to write failures and requires image processing and other tasks (images must be generated from a 60 Hz signal), thus resulting in disadvantages including need for extensive image processing and significantly increased power consumption.

Another possible solution would be to drive the touch panel faster so that the display and contact detection are out of synchronism with each other. With this scheme, however, noise develops unevenly in the lines due to the scanning of the touch panel at the time of display write, thus changing the state written to the pixels from one line to another. This is observed by human eyes as a flicker or other undesirable visual effects.

The liquid crystal display device according to the present embodiment overcomes these disadvantages by employing the above scanning method.

Therefore, the same display device provides faster touch panel driving than display driving while at the same time maintaining the display write and touch panel driving in synchronism with each other.

The first to third embodiments are preferably applicable to FFS (Field Fringe Switching)-mode liquid crystal display devices. It should be noted that, in FIG. 4D, the drive electrode DE and pixel electrodes 22 are stacked on the TFT substrate 21. Therefore, the electrode arrangement assumes that an FFS-mode liquid crystal display device is used. A detailed description will be given below of configuration examples other than the electrode arrangement in an FFS-mode liquid crystal display device and of liquid crystal driving in such a display device.

[Liquid Crystal Driving in Transverse Electric Field Mode]

Figure 13:
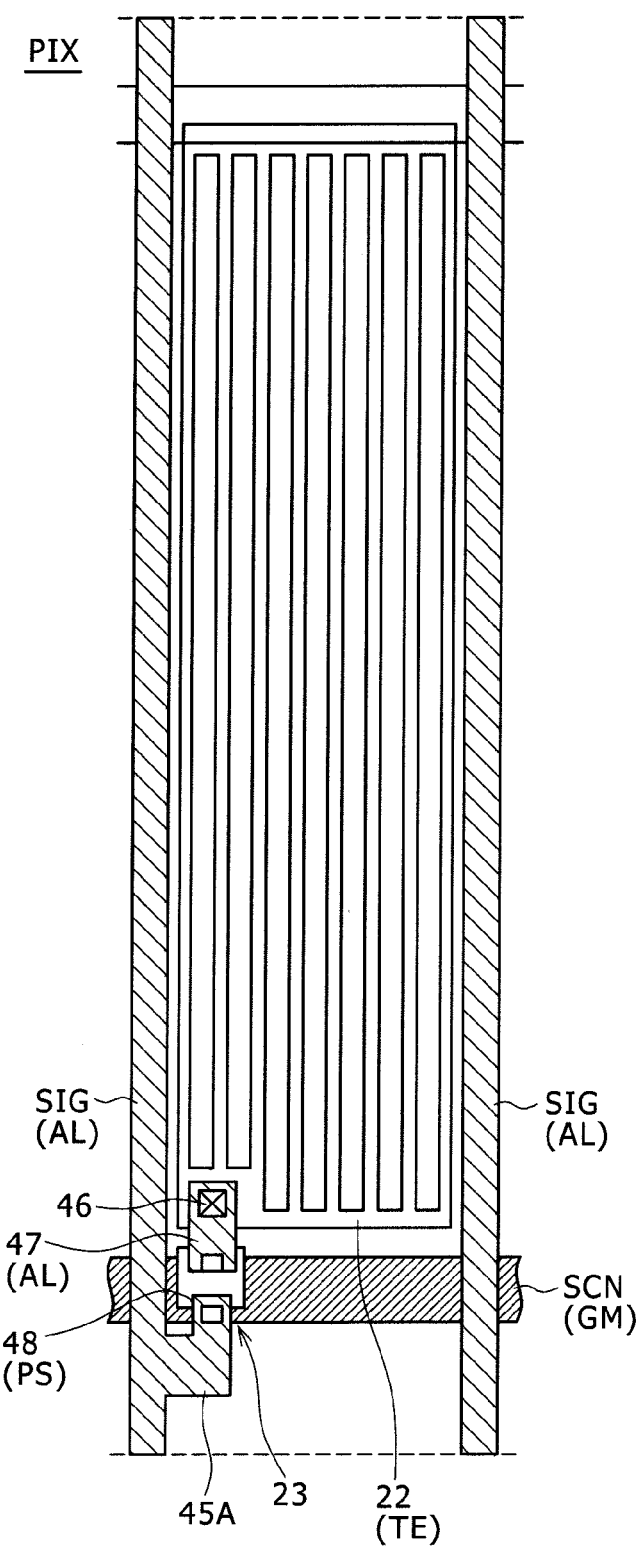
FIG. 13 is a schematic plan view illustrating the relationship between a pixel electrode pattern and other wirings in an FFS-mode liquid crystal display device.

FIG. 13 is a plan view of the TFT substrate 21 showing the pixel (PIX) of an FFS-mode liquid crystal display device.

The pixel electrode 22 is formed with a transparent electrode layer (TE) and has a plurality of slits. The drive electrode is formed below the pixel electrode 22 so that the two electrodes are face to face with each other (FIG. 4D). The drive electrode is formed with a transparent electrode layer (TE) that is shared by all the pixels.

The pixel electrode 22 is connected to an internal wiring 47 via a contact 46. The internal wiring 47 is an underlying layer and made of aluminum (AL). The same wiring 47 is connected to one of the source and drain formed on a thin film semiconductor layer 48 of the TFT 23. The thin film semiconductor layer 48 is made of polysilicon (PS). The signal line SIG made of aluminum (AL) is connected to the other of the source and drain of the thin film semiconductor layer 48. The scan line SCN, provided under the thin film semiconductor layer 48 and crossing the same layer 48, is formed with a gate metal (GM) that is made of molybdenum (Mo) or other material. The scan line SCN is disposed so as to intersect the signal line SIG at a right angle.

It should be noted that the opposed substrate 4 shown in FIG. 4D is stacked above (not shown) the TFT substrate 21 having the various patterns shown in FIG. 13. The liquid crystal layer 6 is formed between the two substrates. First and second polarizers are provided, one on each substrate.

Figure 14A:
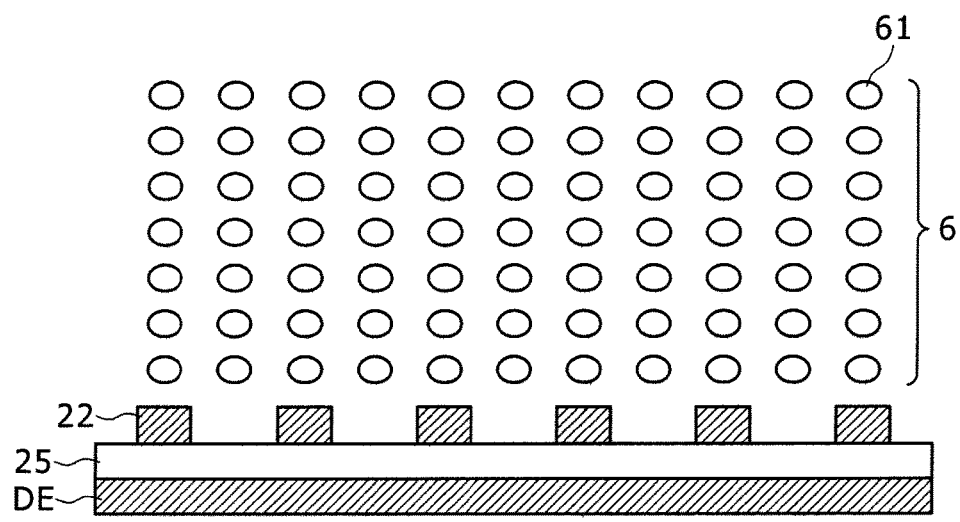
FIGS. 14A and 14B are explanatory diagrams illustrating the driving of liquid crystal in the FFS-mode liquid crystal display device.
Figure 14B:
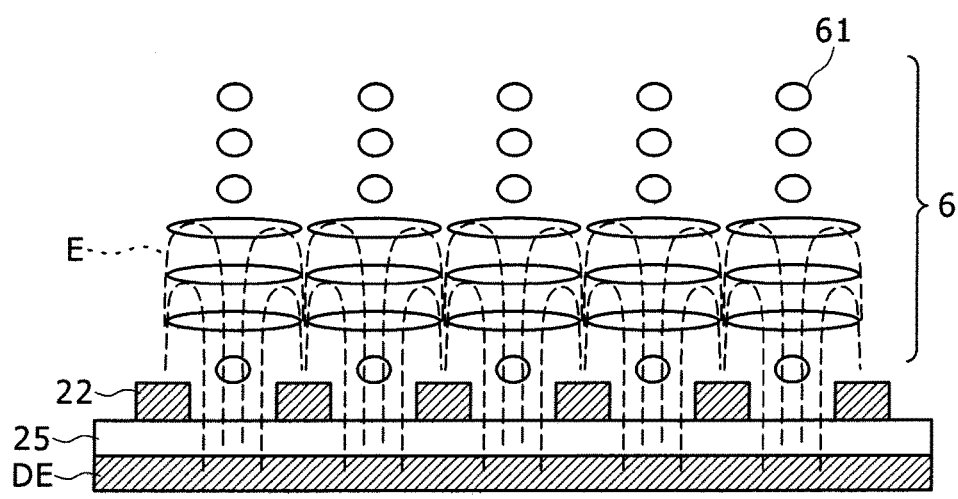

FIGS. 14A and 14B are explanatory diagrams of the display operation by an FFS-mode liquid crystal element. FIG. 14 are enlarged cross-sectional views of the major parts of the liquid crystal element. FIG. 14A illustrates the liquid crystal element with no electric field applied, and FIG. 14B the same element with an electric field applied.

When no voltage is applied between the drive electrode DE and pixel electrode 22 (FIG. 14A), the axis of liquid crystal molecules 61 making up the liquid crystal layer 6 is orthogonal to the transmission axis of the polarizer on the incident side and, at the same time, parallel with the transmission axis of the polarizer on the emission side. Therefore, the incident light transmitting through the polarizer on the incident side reaches the polarizer on the emission side without undergoing any phase shift in the liquid crystal layer 6, thus causing the incident light to be absorbed by the polarizer on the emission side and providing black display.

On the other hand, when a voltage is applied between the drive electrode DE and pixel electrodes 22 (FIG. 14B), the orientation direction of the liquid crystal molecules 61 is rotated diagonally relative to the direction in which the pixel electrodes 22 are extended because of transverse electric fields E that develop between the pixel electrodes. At this time, the electric field intensity during white display is optimized so that the liquid crystal molecules 61 located at the center along the width of the liquid crystal layer 6 rotate about 45 degrees. This produces a phase shift in the incident light that has transmitted through a polarizer 24 on the incident side during its transmission through the liquid crystal layer 6, changing the light into linear polarization as a result of a 90-degree rotation. This causes the light to transmit through the polarizer on the emission side, thus providing white display.

In the display device that drives the liquid crystal in transverse electric field mode when a voltage is applied between the drive electrode DE and pixel electrodes 22, the drive substrate 2 corresponds to an example of a "circuit substrate" on which a "display control circuit" including the pixel circuit (FIG. 5) is formed. This "display control circuit" may include the vertical and horizontal drive circuits.

A description will be given next of modification examples of the first to third embodiments.

4. Modification Example 1

Liquid crystal may be driven in vertical electric field mode in a liquid crystal display device.

Such a liquid crystal display device has the drive electrode DE arranged on the opposed substrate 4 rather than on the TFT substrate 21 shown in FIG. 4D. More specifically, an orientation film is formed on the side of the liquid crystal layer 6 facing the opposed substrate 4. The drive electrode DE is arranged, for example, between this orientation film and color filter 42. This allows for the drive electrode DE and pixel electrodes 22 to apply vertical electric fields to the liquid crystal layer 6 for display driving.

5. Modification Example 2

It was described with reference to FIGS. 4A to 4D that the pitch at which the drive electrode DE is divided should preferably be larger than the pixel pitch, and, for example, be a pitch of several to several tens of pixels. The reason for this is that the excessively narrow drive electrodes DE fail to provide required detection sensitivity.

We assume here that the pitch at which the drive electrodes DE are arranged in the Y direction is the same as the pixel pitch. In this case, a Vcom electrode is cut into long strips, one for each pixel, in the Y direction.

In the case of VGS pixel arrangement, for example, about 700 pixel lines are arranged vertically, with 700 drive electrodes provided, one for each pixel line. A pixel write is performed on a line-by-line basis through progressive scan. However, if the contact is detected using only the Vcom drive signal applied to the write pixel lines, it is necessary to detect, with the single source line SL, the change in electrostatic capacitance which is one 700th of that with the non-divided Vcom drive electrode as a result of the approach of an object to be detected. The change in detection signal at this time is so small that a practical S/N ratio may not be obtained.

For this reason, a plurality of drive electrodes for a plurality of pixel lines may be driven at the same time. This driving is performed separately from the display scan in which the write pixel lines are driven one at a time, thus providing improved detection sensitivity of the touch panel.

Figure 15A:
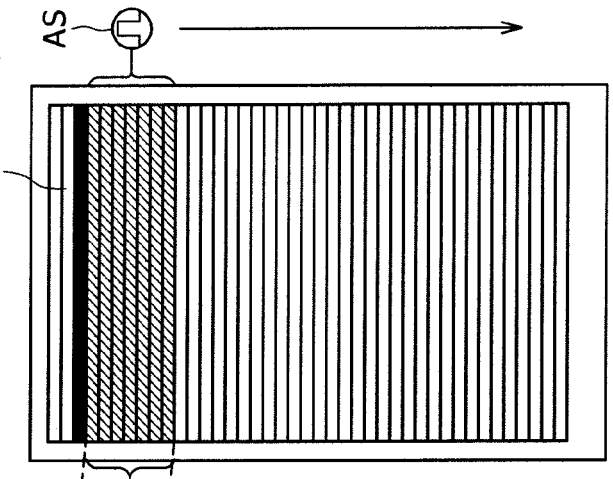
FIGS. 15A to 15C are diagrams schematically illustrating a scanning method according to modification example 2 adapted to scan a plurality of drive electrodes by simultaneously varying their potentials.
Figure 15B:
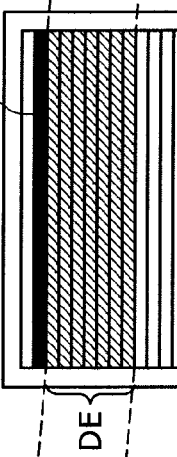
Figure 15C:
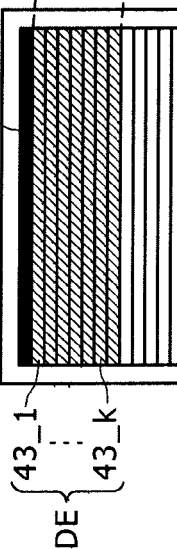

FIGS. 15A to 15C schematically illustrate the scanning method adapted to change the potentials of the plurality of drive electrodes at the same time for scanning.

In FIGS. 15A to 15C, the horizontal lines in the shape of long strips represent the drive electrodes provided one for each pixel line.

In FIG. 15A, on the other hand, the drive electrode DE includes k (where k is an arbitrary number and k=7 as an example) drive electrodes 43_1 to 43_k, one for each pixel line, that are diagonally shaded. FIGS. 15A to 15C illustrate the progression of the drive electrode DE when the same electrode DE is shifted one pixel line at a time in the column direction.

At time T1 in FIG. 15A, a first drive electrode 43_0 falls on the write pixel line WPL. Therefore, the same electrode 43_0 is not selected for contact detection scan. At this time, the drive electrodes 43_1 to 43_k associated with the second to eighth lines are selected and simultaneously subjected to detection scanning and driving using the AC signal source AS.

In the next cycle (at time T2), the write pixel line WPL is shifted to the next drive electrode 43_1. At this time, the drive electrodes DE are also shifted by one pixel line, causing the k drive electrodes starting from the third one to be selected. These drive electrodes DE are driven for contact detection scan.

Similarly, in the next cycle (at time T3), both the write pixel line WPL and drive electrodes DE are shifted by one line, causing the k drive electrodes starting from the fourth one to be driven for contact detection scan. From here onward, shifting and AC driving are repeated.

As described above, not only the pixel line to be written but also other pixel lines are driven by an AC voltage at the same time. It is possible to increase the contact detection output by increasing the number of pixel lines to be simultaneously driven.

For example, simultaneously driving the drive electrodes DE for 100 pixel lines provides about two orders of magnitude better detection signal sensitivity than driving the pixel lines one at a time.

Alternatively, with the drive electrode DE including the k drive electrodes 43 driven by an AC voltage, the same electrodes 43 may be shifted by an amount sufficiently smaller than the pitch at which the same electrodes are arranged. For example, if the drive electrodes 43 are shifted one at a time for contact detection as illustrated in FIGS. 15A to 15C, the boundary between the position being driven and that not being driven is never fixed, thus eliminating stripes resulting from such a boundary. This renders the detection drive electrodes invisible.

If the scanning method described already with reference to FIGS. 6A1 to 12 is used for simultaneous driving of the plurality of drive electrodes 43 shown in FIG. 15A to 15C, the same electrode 43 can be used as a basic unit when the drive electrode DE jumps over the write pixel line WPL, or the number of drive electrodes to be scanned is discretely reduced so that the drive electrode DE does not overlap the write pixel line WPL. That is, the number of drive electrodes to be discretely reduced can be controlled based on a natural number multiple of the drive electrodes 43. Further, the distance between the drive electrode DE subjected to the detection scan and the write pixel line WPL being written can be associated with the natural number multiple of the drive electrodes 43. The scanning method is basically the same as that described with reference to FIGS. 6A1 to 12 in all other respects.

6. Examples of Application to Electronic Equipment

A description will be given next, with reference to FIGS. 16A to 19B, of application examples of the display device described in the first to third embodiments and modification examples 1 and 2. The display device according to the first to third embodiments and modification examples 1 and 2 are applicable to a wide range of electronic equipment including a television set, digital camera, laptop personal computer, personal digital assistant such as mobile phone and video camcorder. In other words, the display device according to the first to third embodiments and modification examples 1 and 2 are applicable to pieces of electronic equipment designed to display an image or video of a video signal externally fed to or generated inside the electronic equipment. Major examples of such electronic equipment will be described here.

Figure 16A:
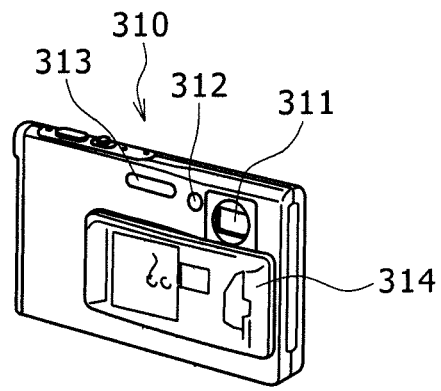
FIGS. 16A and 16B are perspective views illustrating a digital still camera having a liquid crystal display device to which an embodiment of the present invention is applied.
Figure 16B:
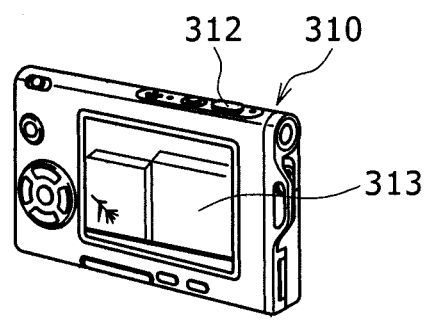

FIGS. 16A and 16B illustrate a digital camera to which the present invention is applied. FIG. 16A is a front view, and FIG. 16B a rear view.

A digital camera 310 illustrated in FIGS. 16A and 16B includes an image pickup lens in a protective cover 314, a flash-emitting section 311, a display section 313, control switch, menu switch, a shutter 312 and other parts. The digital camera 310 is manufactured by using the display device having the touch sensor function described in the first to third embodiments and modification examples 1 and 2 as the display section 313.

Figure 17:
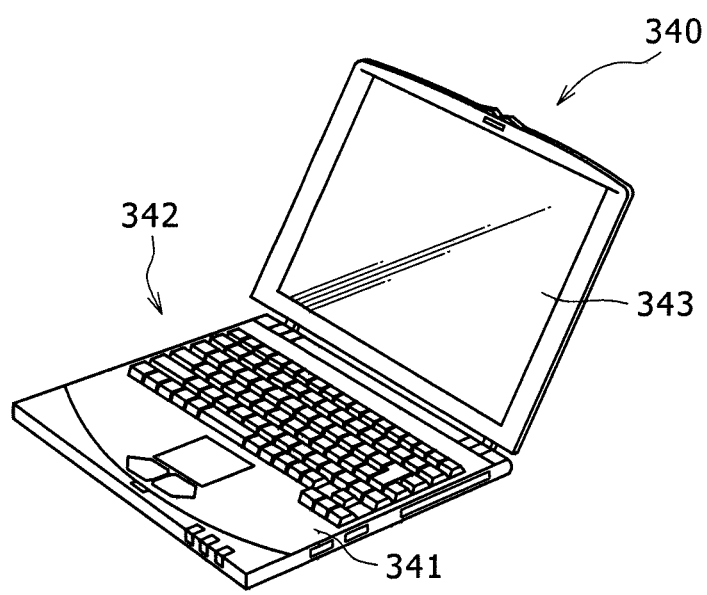
FIG. 17 is a perspective view illustrating a personal computer having a liquid crystal display device to which the embodiment of the present invention is applied.

FIG. 17 illustrates a laptop personal computer to which the present invention is applied.

A laptop personal computer 340 illustrated in FIG. 17 includes a keyboard 342 adapted to be manipulated for entry of text or other information in a main body 341 and a display section 343 adapted to display an image in the main body cover. The laptop personal computer 340 is manufactured by using the display device having the touch sensor function described in the first to third embodiments and modification examples 1 and 2 as the display section 343.

Figure 18:
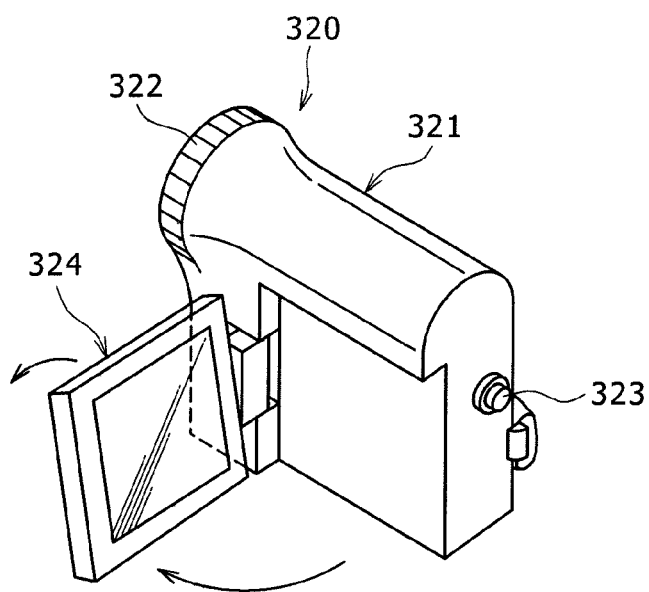
FIG. 18 is a video camcorder having a liquid crystal display device to which the embodiment of the present invention is applied.

FIG. 18 illustrates a video camcorder to which the present invention is applied.

A video camcorder 320 illustrated in FIG. 18 includes a main body section 321, a lens 322 provided on the front-facing side surface to capture the image of the subject, an imaging start/stop switch 323, a monitor 324 and other parts. The video camcorder 320 is manufactured by using the display device having the touch sensor function described in the first to third embodiments and modification examples 1 and 2 as the monitor 324.

Figure 19A:
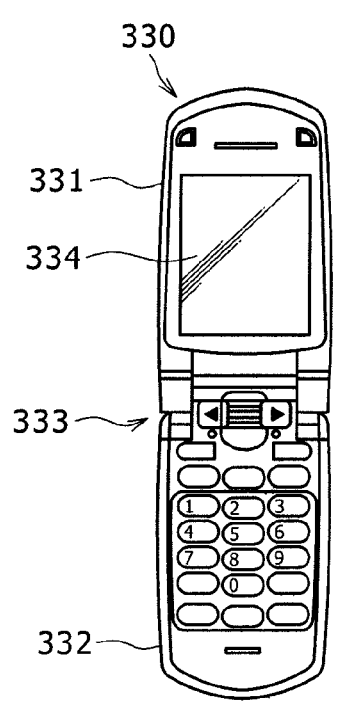
FIGS. 19A and 19B are front views illustrating a mobile terminal device in open and closed positions having a liquid crystal display device to which the embodiment of the present invention is applied.
Figure 19B:
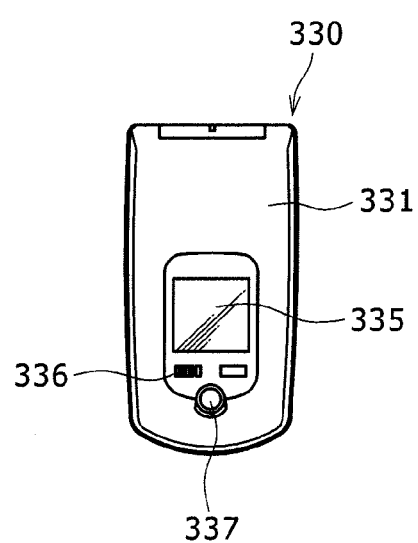

FIGS. 19A and 19B illustrate a personal digital assistant to which the present invention is applied. FIG. 19A illustrates the personal digital assistant in an open position. FIG. 19B illustrates the personal digital assistant in a closed position.

A personal digital assistant 330 illustrated in FIGS. 19A and 19B includes an upper enclosure 331, a lower enclosure 332, a connecting section (a hinge section in this example) 333, a display 334, a subdisplay 335, a picture light 336, a camera 337 and other parts. The mobile phone 330 is manufactured by using the display device having the touch sensor function described in the first to third embodiments and modification examples 1 and 2 as the display 334 and subdisplay 335.

As described above, the preferred embodiments of the present invention provide a display device with minimal latency during contact detection scan, driving method of the same and electronic equipment using the same.

The present application contains subject matter related to that disclosed in Japanese Priority Patent Application JP 2009-155194 filed with the Japan Patent Office on Jun. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device, comprising:
a plurality of pixel electrodes arranged in a first area,
a plurality of drive electrodes arranged in the first area and corresponding to the plurality of pixel electrodes;

a drive controller configured to:
drive all of the plurality of pixel electrodes as a display scan operation,
sequentially drive all of the plurality of drive electrodes as a detection scan operation, and
perform the detection scan operation two or more times during one time of the display scan operation,
wherein the plurality of drive electrodes include a first end drive electrode arranged at a first end of the first area and a second end drive electrode arranged at a second end of the first area in a first direction;
wherein the drive controller starts a second detection scan operation including a first part and a second part after a first detection scan operation during one time of the display scan operation;
wherein the drive controller is configured to scan continuously from a third drive electrode of the plurality of drive electrodes to the second end drive electrode as the first part of the second detection scan operation; and
scan continuously from the first end drive electrode to the third drive electrode as the second part of the second detection scan operation,
wherein the third drive electrode is next to a first display area in the first direction, and
wherein the first display area is an area in which the drive controller drives at least one of the plurality of pixel electrodes at a most recent timing at which the drive controller starts the second detection scan operation.

2. The display device according to claim 1,
wherein the plurality of pixel electrodes are present on a first plane of the first area and the plurality of drive electrodes are present on a second plane of the first area that is different from the first plane.

3. The display device according to claim 1,
further comprising a plurality of sensor electrodes, wherein the plurality of sensor electrodes are configured to output an electrical change while the drive controller scans the plurality of drive electrodes.

4. The display device according to claim 1,
wherein the drive controller is configured to scan the plurality of pixel electrodes from a first end to a second end in the first direction and scan the plurality of drive electrodes from the first end to the second end in the first direction and wherein the third drive electrode is between the first display area and the second end.

5. A method of driving a display device including a plurality of pixel electrodes arranged in a first area and a plurality of drive electrodes arranged in the first area and corresponding to the plurality of pixel electrodes, wherein the plurality of drive electrodes include a first end drive electrode arranged at a first end of the first area and a second end drive electrode arranged at a second end of the first area in a first direction: the method comprising:
performing a detection scan operation two or more times during one time of a display scan operation;
wherein the display scan operation is an operation in which all of the plurality of pixel electrodes are scanned sequentially;
wherein the detection scan operation is an operation in which all of the plurality of drive electrodes are scanned sequentially;
wherein the drive controller starts a second detection scan operation including a first part and a second part after a first detection scan operation during one time of the display scan operation;
scanning continuously from a third drive electrode of the plurality of drive electrodes to the second end drive electrode as the first part of the second detection scan operation; and
scanning continuously from the first end drive electrode to the third drive electrode as the second part of the second scan detection scan operation,
wherein the third drive electrode is next to a first display area in the first direction, and
wherein the first display area is an area in which at least one of the plurality of pixel electrodes is driven at a most-recent timing at which the second detection scan operation starts.

* * * * *